US007957274B2

(12) United States Patent
Balakrishnan et al.

(10) Patent No.: US 7,957,274 B2
(45) Date of Patent: Jun. 7, 2011

(54) INTELLIGENT ROUTING FOR EFFECTIVE UTILIZATION OF NETWORK SIGNALING RESOURCES

(75) Inventors: Ram Balakrishnan, Stittsville (CA); Mustapha Aissaoui, Kanata (CA); Mudashiru Busari, Ottawa (CA); John Coffell, Kanata (CA); Shawn McAllister, Manotick (CA); Peter Roberts, Stittsville (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 1365 days.

(21) Appl. No.: 10/207,844

(22) Filed: Jul. 31, 2002

(65) Prior Publication Data

US 2003/0053415 A1 Mar. 20, 2003

(30) Foreign Application Priority Data

Sep. 14, 2001 (CA) ..................................... 2357785

(51) Int. Cl.
*H04J 1/16* (2006.01)

(52) U.S. Cl. ......................... 370/230; 370/231; 370/232

(58) Field of Classification Search .................. 370/229, 370/230.1, 232, 235, 236, 237, 239, 252, 370/253, 395.1, 395.2, 395.21, 230
See application file for complete search history.

(56) References Cited

U.S. PATENT DOCUMENTS 5,649,108 A * 7/1997 Spiegel et al. ................ 709/241
5,856,981 A * 1/1999 Voelker ......................... 714/712

(Continued)

FOREIGN PATENT DOCUMENTS

CN 1152834 A 6/1997

(Continued)

OTHER PUBLICATIONS

Fuhrmann, Kogan, and Milito, "An Adaptive Autonomous Network Congestion Controller", IEEE Proc. Of 35th Conf. On Decision and Control, Kobe, Japan, Dec. 1996, vol. 1, 1996, pp. 301-306.*

(Continued)

*Primary Examiner* — Dang T Ton
*Assistant Examiner* — Brian O'Connor
(74) *Attorney, Agent, or Firm* — Kramer & Amado, P.C.

(57) ABSTRACT

In source routed or hop-by-hop routed protocol communication networks, when congestion is detected at a certain network element, a notification message is sent to nodes. The nodes keep track of congestion condition and generally have knowledge of the congestion, thereby allowing them to make more intelligent routing decisions, i.e., rate controlling messages, routing traffic around congestion, regulating admission at the edge of the network. The intelligent routing decision is based on the congestion condition indicated by a restriction level which is periodically and dynamically updated.

7 Claims, 6 Drawing Sheets

U.S. PATENT DOCUMENTS

| | | | | |
|---|---|---|---|---|
| 5,914,936 | A * | 6/1999 | Hatono et al. | 370/230 |
| 5,936,940 | A * | 8/1999 | Marin et al. | 370/232 |
| 6,038,218 | A | 3/2000 | Otsuka et al. | 370/236 |
| 6,046,983 | A * | 4/2000 | Hasegawa et al. | 370/236.1 |
| 6,067,287 | A * | 5/2000 | Chung-Ju et al. | 370/232 |
| 6,069,895 | A * | 5/2000 | Ayandeh | 370/399 |
| 6,167,025 | A * | 12/2000 | Hsing et al. | 370/216 |
| 6,201,810 | B1 * | 3/2001 | Masuda et al. | 370/395.32 |
| 6,212,164 | B1 * | 4/2001 | Murakami et al. | 370/230 |
| 6,356,629 | B1 * | 3/2002 | Fourie et al. | 379/112.1 |
| 6,363,052 | B1 * | 3/2002 | Hosein | 370/230 |
| 6,470,022 | B1 * | 10/2002 | Rochberger | 370/437 |
| 6,614,756 | B1 * | 9/2003 | Morgenstern et al. | 370/230 |
| 6,690,645 | B1 * | 2/2004 | Aweya et al. | 370/230 |
| 6,813,245 | B1 * | 11/2004 | Furuno | 370/236 |
| 7,149,184 | B2 * | 12/2006 | Takada et al. | 370/230 |

FOREIGN PATENT DOCUMENTS

| | | |
|---|---|---|
| CN | 1268006 A | 9/2000 |

OTHER PUBLICATIONS

"Q.714, Switching and Signalling, Specifications of Signalling System No. 7—Signalling connection control part" Signalling connection control part procedures ITU-T Jul. 1996, ITU-T Recommendation Q.714.

"Q.704, Switching and Signalling, Specifications of Signalling System No. 7—Message transfer part" Signalling network functions and messages ITU-T Jul. 1996, Recommendation Q.704.

* cited by examiner

Call Set-up Message
120
Invoke path selection mechanism
A
122
Are there any nodes for which SCCB exists on the selected path?
Y
N
Accept the call for the selected path
124
126
Query SCCB if the call set-up message acceptable?
N
Y
Accept the call for the selected path
128
130
Is there an alternate path available?
N
Y
Reject the call
134
Select the alternate path as the selected path
132
A

```
rejectedPerSec = [obtained from Signaling Congestion Feedback Monitor]
admittedPerSec = [obtained from Signaling Congestion Admission Control]
if (rejectedPerSec >= TRR)
{// reduce the admission rate
  restriction_level = max ( admittedPerSec + TRR - rejectedPerSec,
                                    MinRestriction) ;
  UpCount = 0;
}
else
{// increase the admission rate
  if (UpCount < LinearUpCountInterval)
     increment = 1;
  else
     increment = 2^(UpCount-LinearUpCountInterval);
  restriction_level = restriction_level + increment;
   UpCount++;
}
```

*FIG. 5*

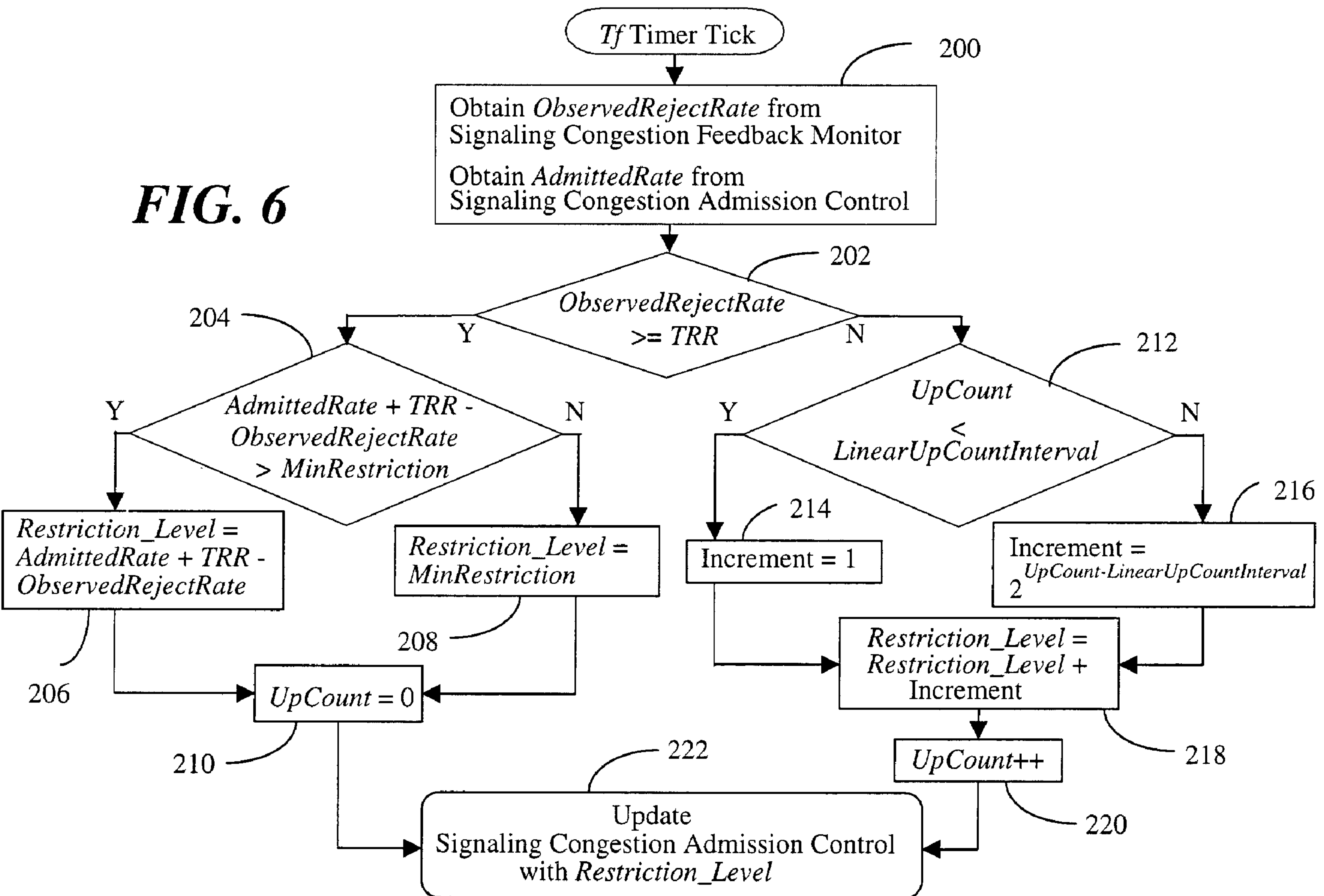
FIG. 6
Tf Timer Tick
200
Obtain ObservedRejectRate from Signaling Congestion Feedback Monitor
Obtain AdmittedRate from Signaling Congestion Admission Control
202
ObservedRejectRate >= TRR
Y
N
204
AdmittedRate + TRR - ObservedRejectRate > MinRestriction
Y
N
206
Restriction_Level = AdmittedRate + TRR - ObservedRejectRate
208
Restriction_Level = MinRestriction
210
UpCount = 0
212
UpCount < LinearUpCountInterval
Y
N
214
Increment = 1
216
Increment = $2^{UpCount-LinearUpCountInterval}$
218
Restriction_Level = Restriction_Level + Increment
220
UpCount++
222
Update Signaling Congestion Admission Control with Restriction_Level

INTELLIGENT ROUTING FOR EFFECTIVE UTILIZATION OF NETWORK SIGNALING RESOURCES

FIELD OF INVENTION

The invention relates generally to source routed or hop-by-hop routed protocol communication networks. More particularly, it relates to a technique of by which network elements are able to make intelligent decisions for routing call set-ups, thus improving the efficiency of such communication networks.

BACKGROUND OF INVENTION

Communication between a calling party (source) and a called party (destination) may be established over a communications network. Such a communications network may use source routed protocols in order to establish connections over which such communication can occur. Communication networks that support source routing protocols typically include a number of individual switches through which calls are routed. A call set-up message is sent along a path between the source and the destination through a number of intervening switches in order to establish the call. The path for the call set-up message to travel may be selected by the source in some networks or may be selected hop-by-hop by intervening switches in others.

Signaling protocols can encounter congestion in the control plane used to carry such set-up messages. The signaling plane congestion can be the result of a number of different factors, including an overabundance of signaling traffic such as call set-up messages and/or control plane datagram messages, device speed mismatches with the communication network, or over-utilization of particular nodes or switches within the network.

In some prior art systems, a node in the network under congestion may send a signaling congestion notification to the source node in response to a set-up message it received. In other prior art systems, it may simply drop the set-up message. Furthermore, even if the source node or any other nodes receive the notification, this action will not influence the routing of subsequent calls and so new calls will continue to be routed through the congestion point, only to block and be cranked back. As a result, sub-optimal use of network control plane resources occurs during periods of signaling congestion. This leads to call failures due to resource deficiencies and signaling protocol time-outs. In addition, it leads to large increase in call setup latency. Therefore, increased signaling congestion may result in severely degraded signaling performance.

In U.S. patent application Ser. No. 09/549,328, entitled "Method And Apparatus For Congestion Avoidance In Source Routed Signaling Protocol Communication Networks", filed on Apr. 13, 2000 in the name of the present applicant, congestion avoidance techniques to prevent such a degradation of signaling performance are described. According to the techniques described therein, when control plane congestion is detected, a congestion notification message containing particulars of a congestion is generated and sent back to the source node or other nodes. A network element receives the congestion notification message and uses the particulars of a congestion for various network functions, including routing new set-up messages. Therefore, by understanding congestion information as it relates to the network topology, when generating a connection set-up message, a node can route the message in an intelligent manner that avoids congested portions of the network.

The present invention provides mechanisms that allow the network elements such as nodes to have knowledge of the state of signaling plane congestion, thereby allowing them to make more intelligent routing decisions, i.e., rate controlling call set up messages, routing control traffic around signaling congestion, regulating admission at the edge of the network.

The present invention is also applicable to routing and forwarding of connectionless traffic. The mechanisms of the present invention, therefore, also allow the network elements to have knowledge of the state of congestion in such plane, thereby allowing them to make more intelligent routing decisions.

The present invention works particularly well in conjunction with the techniques described in the above-referenced application. It should however noted that the present invention should also perform well in other environment, such as in the field of routing and forwarding any traffic, in which network elements are designed to react to congestion notification.

SUMMARY OF INVENTION

In accordance with one aspect, the invention utilizes congestion notification for routing control traffic around or regulating it through the network element at which congestion has been detected.

In accordance with a further aspect, the invention utilizes congestion notification for routing traffic around or regulating it through the network element at which the signaling plane congestion has been detected.

In accordance with another aspect, the invention relates to intelligent routing based on signaling capacity estimation for effective utilization of network signaling resources.

In accordance with a further aspect, the invention relates to intelligent routing based on routing capacity estimation for effective utilization of network routing resources.

In accordance with a further aspect, the invention provides mechanisms that allow the network elements such as nodes to estimate the intensity of signaling plane congestion, and based on the estimate to make more intelligent routing decisions.

In accordance with another aspect, the invention also allows the network elements to have knowledge of the state of congestion in a plane of routing and forwarding traffic, thereby allowing them to make more intelligent routing decisions.

In accordance with yet another aspect, the invention improves performance of signaling resources in a telecommunications network. The improvement is realized by a method which includes steps of receiving a call set-up message at a network element and invoking a path selection process on the call set-up message to determine existence of at least one network element on a selected path, for which a restriction level exists. The method further includes steps of making a routing decision on the call set-up message based on the restriction level, executing the routing decision at the network element at which the call set-up message is received and periodically adjusting the restriction level for said each network element, wherein the step of executing the routing decision involves either rejecting or accepting the call set-up message.

In accordance with a further aspect, the invention is a method of controlling congestion condition at a network element of a telecommunications network. The method includes steps of monitoring call set-up messages that have been accepted or rejected by the network element under congestion and setting a restriction level indicative of the congestion condition based on the rates of accepted and rejected call set-up messages. The method further includes a step of making a routing decision on a new call set-up message that is on a path through the network element under congestion, using the restriction level, whereby the congestion condition will not worsen.

In accordance with yet another aspect, the invention is directed to a node in a source routed signaling protocol communications network. The node comprises a path selection block for performing a path selection process on a call set-up message received at the node and a congestion control block being allocated for a network element under congestion and comprising a congestion admission control module and a congestion feedback monitor module. The congestion admission control module maintains a restriction level for the network element under congestion and determines if the call set-up message is acceptable based on the restriction level. The congestion feedback monitor module updates the restriction level based on an indication of received congestion notifications. The node further includes a release message processing block for receiving the congestion notifications sent from the network element under congestion and informing the congestion feedback monitor module of their reception.

BRIEF DESCRIPTION OF DRAWINGS

FIG. 5 shows a pseudo-code of a process of adjusting the restriction level, according to an embodiment of the invention.

FIG. 6 is a flowchart to adjust the restriction level of a call admission rate according to an embodiment of the invention.

DETAILED DESCRIPTION OF PREFERRED EMBODIMENTS OF INVENTION

In a communication network that utilizes a source routing signaling protocol, when signaling plane congestion is detected at a network element, a congestion notification message is generated corresponding to the detected signaling plane congestion. Network elements use the signaling plane congestion message to communicate with each other concerning particulars of existing signaling congestion. The network elements then use the congestion particulars to perform their various network functions, including routing and/or regulating new set-up messages. While signaling plane congestion is described in detail below, it should be noted that the invention finds equally applications in the field of routing and forwarding other traffic. Therefore, in the general aspect, the invention provides ways of designing behaviours of network elements which performs routing and forwarding decision in response to state of network elements and also provides network elements designed in such a way.

Figure 1:
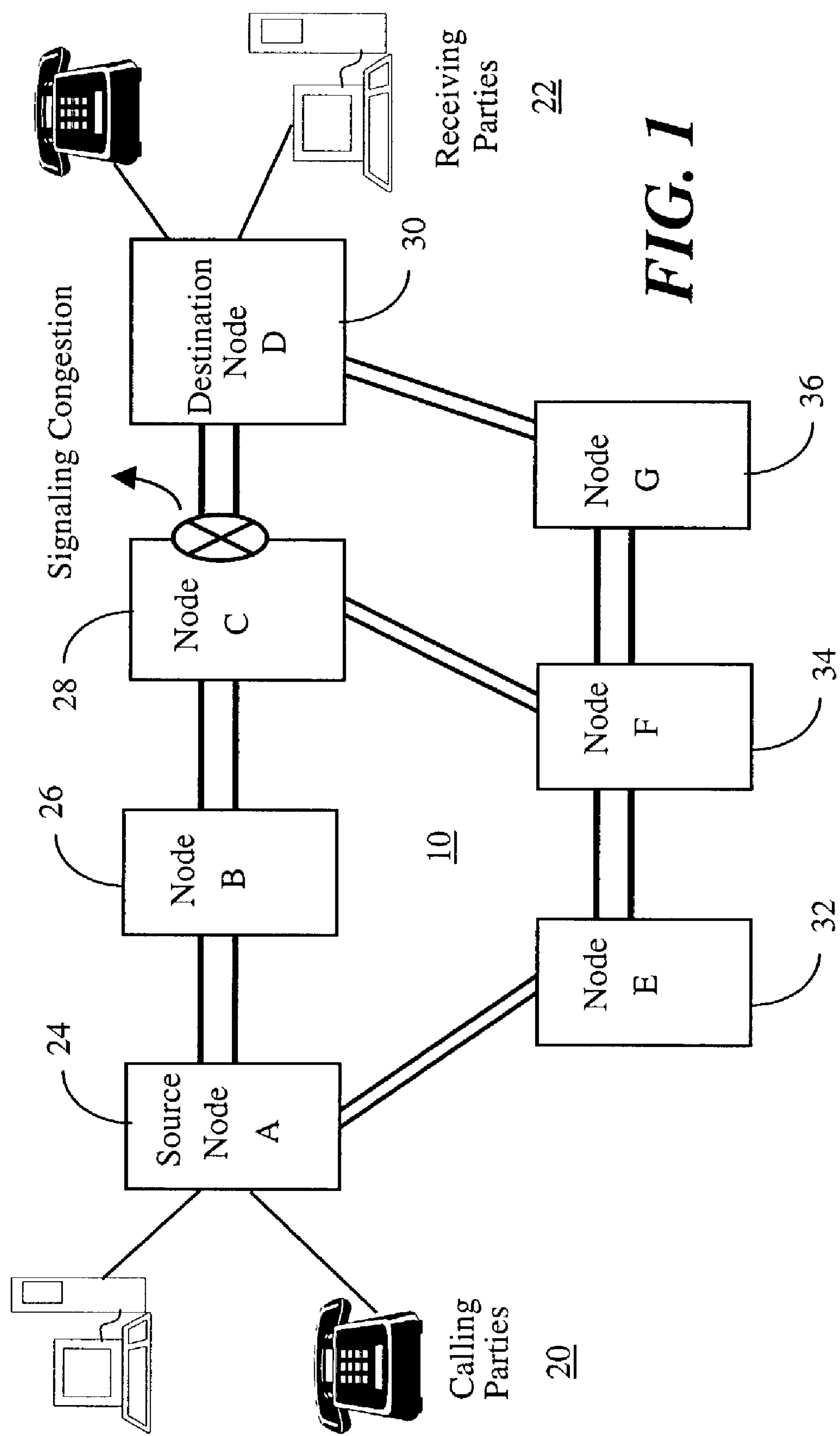
FIG. 1 is a block diagram of a data communications network in accordance with an embodiment of the invention.

The invention can be better understood with reference to FIGS. 1-6. FIG. 1 illustrates a communications network 10 which may be packet- or cell-based communications network. The communications network 10 may be an ATM network with Private Network-Network Interface (PNNI) signaling and routing protocol, in which case the network is a source routed protocol network. Networks of other kinds, e.g., MPLS, are possible applications of the present invention. Such other networks may use hop-by-hop routing, in which a set-up message is routed hop by hop, in other word, the path selection is performed by each network element as the set-up message travels towards the destination. The network 10 allows the originating parties 20 to communicate with the destination parties 22 by establishing a connection through the various network elements 24, 26, 28, 30, 32, 34 and 36 (in this example nodes A-G) included in the network 10. Each of the originating and destination parties 20 and 22 may be router, a network coupled to a router, and/or an end user device such as a personal computer, facsimile machine, video telephone, or any device that receives and or transmits data via a communication network. Network elements or nodes 24-36 in the Figure may be telecom switches, routers, etc., that are able to make route selection. When an originating party 20 requests that a connection be established with a destination party 22, the originating node A 24 attempts to establish a connection with the destination node D 30 such that packets or cells may traverse the network along the connection and be delivered to the destination party 22.

Source routing protocols allow each node within the network to determine a complete path to a particular destination based on that node's knowledge of the network topology. Typically, each of the various switches, or nodes, within the network stores a routing table or other database that includes parameters concerning the various links (i.e., topology) of the network that may be used in routing calls. When a path to a particular destination is to be determined, the table is consulted to determine a path to the destination. The selection of the path may include determining the most efficient path, where various criteria such as cost, bandwidth availability, and the like are taken into account.

For example, if the originating node A 24 wishes to establish a connection with the destination node D 30, a likely path may route the connection through the node B 26 and the node C 28. In such an example, the originating node A 24 issues a connection set-up message that traverses the network along the determined path and establishes the connection. The connection set-up message may traverse the network along the signaling plane within the network, where the signaling plane is separate from the data plane that carries data packets for various connections within the network.

Referring further to FIG. 1, if signaling plane congestion exits proximal to the node C 28, a set-up message is significantly delayed, causing the connection attempt to time-out or be rejected by node C 28. Such congestion proximal to the node C 28 may be internal to the node C 28 or may be along the link between the node C 28 and the node D 30. A time-out condition or detection of congestion causes a release message or an indication that control traffic to the congested node should be reduced to be sent to the originating node A 24 indicating that the connection set-up request failed.

The above referenced U.S. patent application describes a means for communicating the congested condition existing proximal to the node C 28 to other node within the network 10, including the originating node A 24. The originating node A 24 receives notification of the congested condition at the node C 28, and then can route future connection set-up messages (both for the connection that has already been attempted and for future connections that must be established) along alternate paths such that unacceptable delays in connection setup do not result. The congestion notification may be generated as a result of a received connection set-up request, or may be broadcast when the congested condition is first detected proximal to the node C 28.

Communication of congestion notification is performed via a signaling network in some networks. Other networks utilize a signaling or routing plane or a combination of both, using a routing and signaling protocol, e.g., an ATM network uses Private Network-Network Interface (PNNI) signaling and routing protocol. In PNNI networks, a routing plane congestion message may take advantage of a resource availability information group (RAIG for short) which includes information used to attach values of topology state parameters to nodes, links, and reachable addresses.

The congestion notification provided via the signaling plane may also be provided to each network element along the path traversed by the connection setup message (from the source node to the congested node), such that each of the network elements along the connection set-up path is also notified of the congested element. These additional nodes may then utilize such knowledge to perform their own network function decisions.

When the network uses a signaling protocol that is supported by source routing, the signaling plane congestion notification may be included in a release message that includes a crankback information element. A crankback information element may be produced when a connection set-up message is held up due to congestion, where the crankback information element would include a special cause code indicating the congestion. The release message with crankback information element is relayed back to the source node that issued the connection set-up message such that the source node will attempt to find an alternate path to the destination. Such crankback messages (i.e., release messages with a crankback information element) may be used in an ATM network that utilizes a Private Network-Network Interface (PNNI) routing and signaling protocol.

Prior art systems utilizing the PNNI signaling protocol are limited to using crankback for reachability issues, resource errors, and designated transit list processing errors. Signaling congestion is not covered in these categories supported and therefore was not supported in prior art PNNI systems. The modified PNNI crankback message allows the source node compute an alternate path for a failed call that avoids the congested element within the network. According to one embodiment, such information about signaling congestion can then also be used to influence the routing of subsequent calls routed by this node such that calls routed through areas experiencing signaling congesting are avoided or regulated when calls are first routed, rather than just upon crankback.

Figure 2:
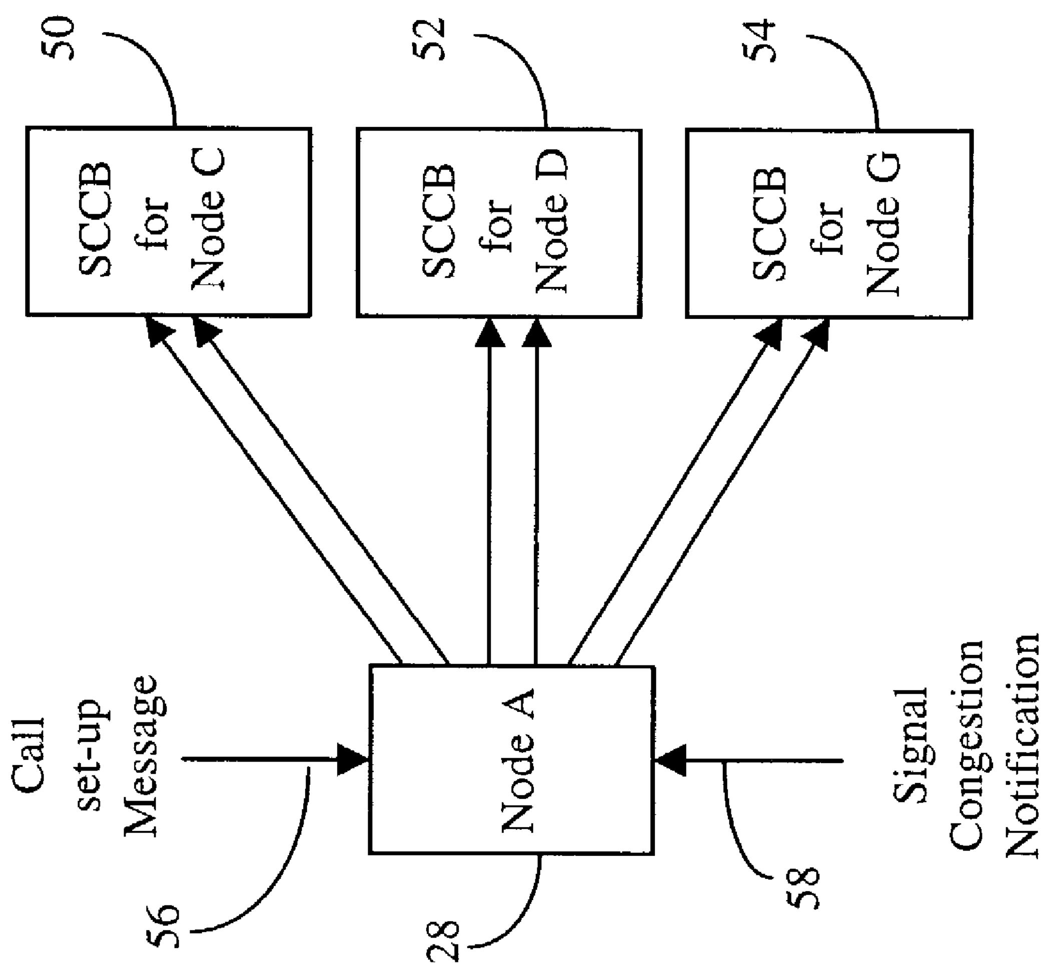
FIG. 2 illustrates schematically a general aspect of the invention which makes use of control blocks called "signaling congestion control block" according to an embodiment of the invention.

FIG. 2 illustrates schematically a general aspect of the invention which makes use of control blocks called "signaling congestion control block" (SCCB for short) for monitoring congestion notification and for controlling signaling traffic routed through the network element at which the signaling plane congestion has been detected. Referring to FIGS. 1 and 2, any source nodes, that determine the path and route calls, allocate a SCCB for each network element known to be experiencing signaling congestion. For example, node A 24 has allocated three SCCBs 50, 52, 54, each for node C, node E, and node G. The allocation of an SCCB for a network element occurs, if there is no existing SCCB for the network element and when the source node receives a signaling congestion notification from the network element. Node A 24 also receives new call request 56 and congestion notification 58 in the form of e.g., release messages etc.

A SCCB contains state information used to rate control new calls through the congested network element. The admission rate of a SCCB is dynamically adjusted based on the rate at which signaling congestion notifications are received from the associated congestion point.

Figure 3:
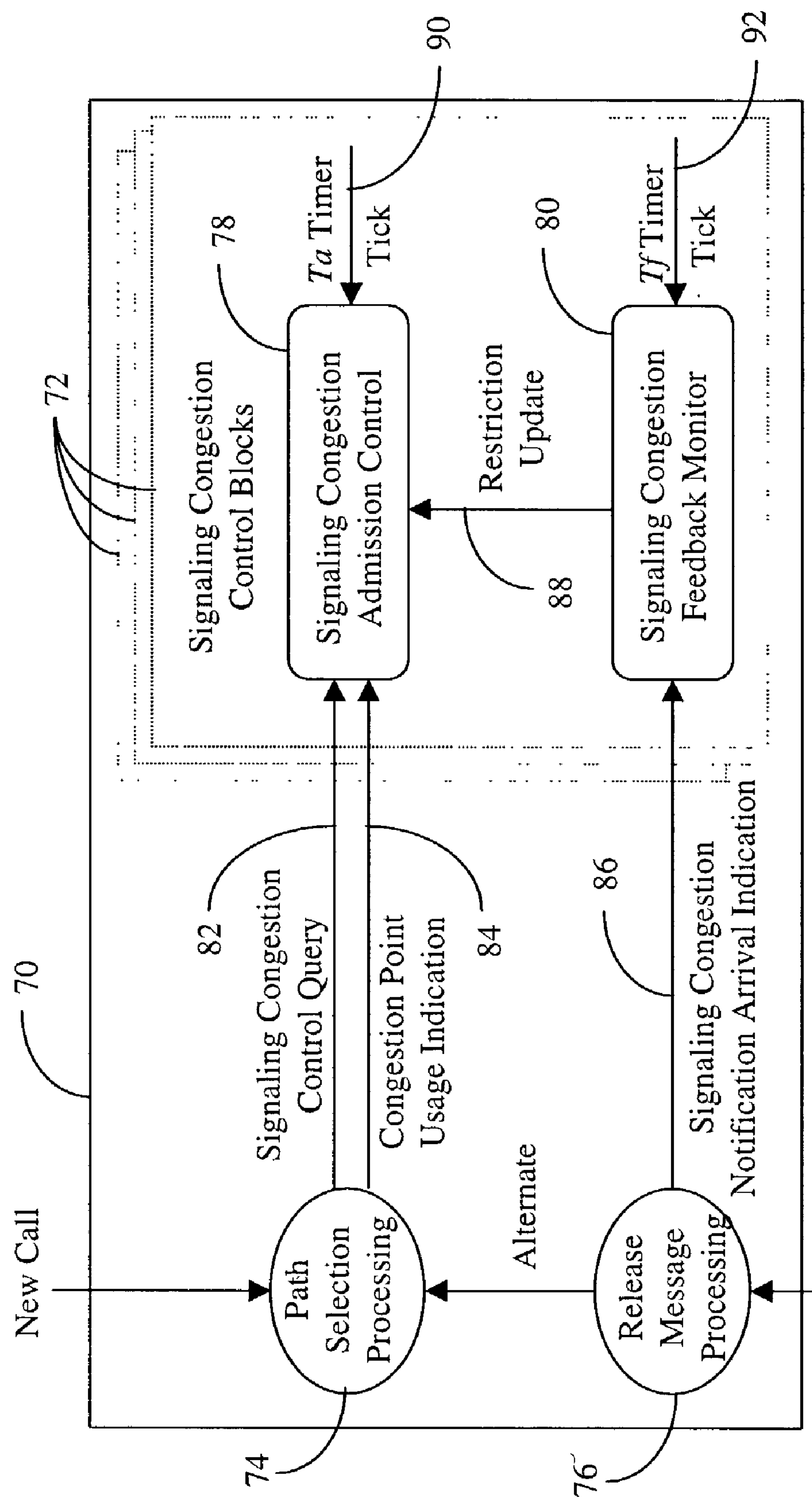
FIG. 3 shows schematically one of signaling congestion control blocks, and shows its interactions with a call-processing layer mechanism and a release message processing mechanism.

FIG. 3 shows a call processing layer which encompasses a SCCB and certain functions of a call-processing layer mechanism. The Figure therefore shows one of a plurality of SCCBs 72 and the major interactions of a SCCB with the rest of the call-processing layer, such as path selection processing 74 and release message processing 76. As shown in FIG. 3 architecturally a SCCB 72 consists of two components. For sake of easy reference the two components are referred here as signaling congestion admission control (SCAC for short) 78 and signaling congestion feedback monitor (SCFM for short) 80.

Signaling Congestion Admission Control (SCAC): This component 78 regulates the admission rate (e.g., the number of set-up messages admitted per unit time) at which set-up messages are routed towards the associated signaling congestion point. The component maintains a restriction level. This restriction level is used to evaluate if it is acceptable to include the associated congestion point in the path of a call routed at that time. Therefore, if a new call will result in exceeding the restriction level maintained in SCAC, SCCB refuses such an inclusion. Path selection processing mechanism 74 makes such a query 82 to the concerned SCCB for each call request to be routed towards an identified congestion point. If there are multiple congestion points in a path selected for routing a new call, then all the appropriate SCCBs are queried. If SCCB 70 refuses the inclusion of a congestion point, then the call is routed around it, provided such an alternative is available. SCAC component also keeps track of the number of calls routed towards its associated congestion point over a certain period of time. In order to help the component in keeping such a track, the path selection mechanism 74 notifies SCAC component at 84, each time it routes a new call through its congestion point.

Signaling Congestion Feedback Monitor (SCFM): This component 76 keeps track of number of signaling congestion notification received from its associated congestion point over a certain period of time. To facilitate the feedback monitoring process, the release message processing mechanism 76 notifies SCFM component at 86, each time it receives a signaling congestion notification from the associated congestion point. Based on this information, SCFM component dynamically calculates a new value of the restriction level and updates SCAC component with this new value at 88. This will result in either tightening or loosening call admission rate by SCFM component. This leads to the convergence of call admission rate to a steady-state value that can be sustained by the congestion point.

To smooth the distribution of call admission rate towards a congestion point, SCAC component rate-controls the call admission in each Ta milliseconds, as shown by 90. Moreover, to provide fast convergence of call admission rate to the capacity of a signaling congestion point, SCFM updates the restriction level in every Tf millisecond ($Tf=n*Ta$, where n is a positive integer), as shown by 92.

Figure 4:
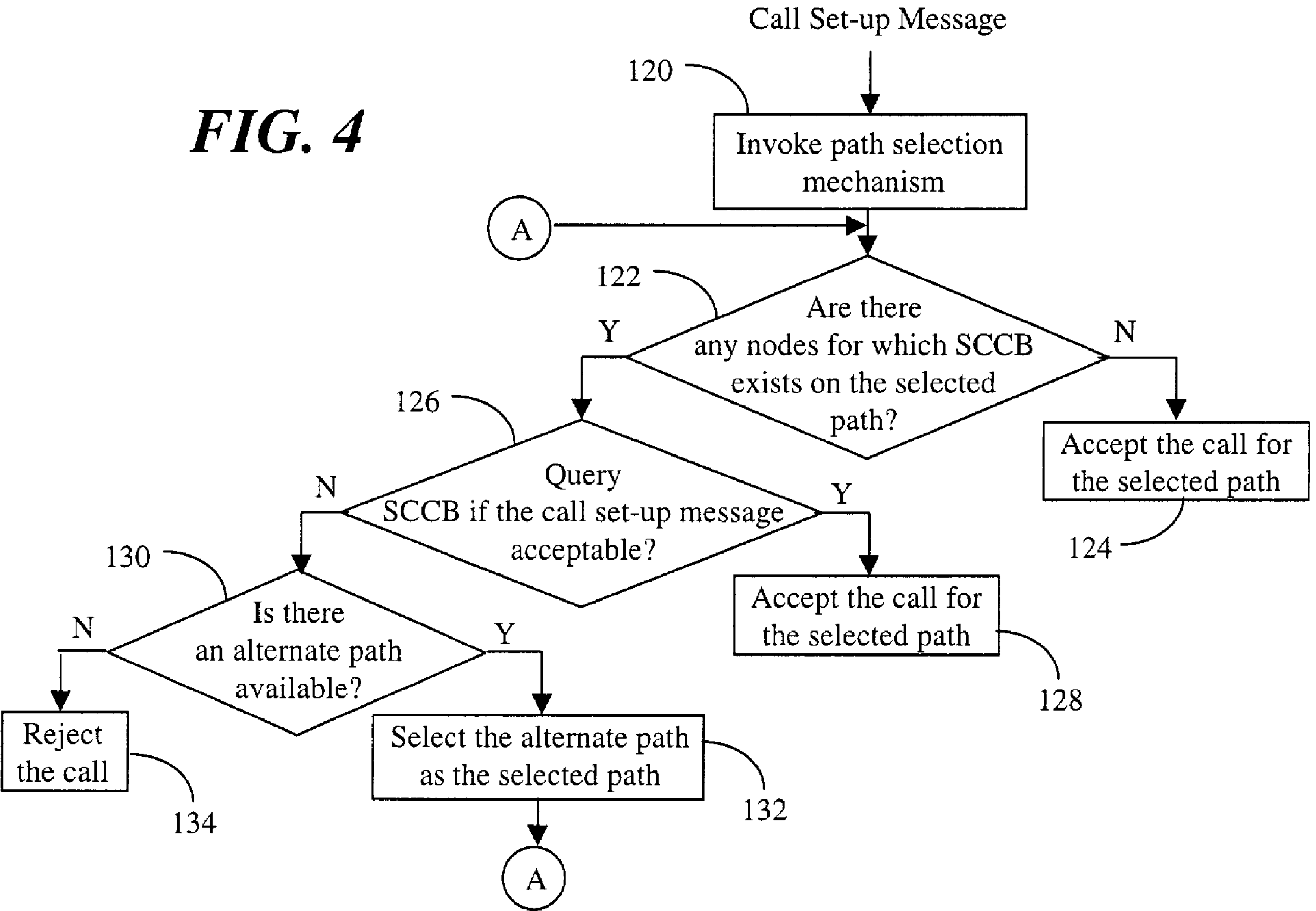
FIG. 4 is a flowchart illustrating a node processing a new call set-up message.

FIG. 4 is a flowchart of processing a new call set-up message received at a node (network element). Upon receiving a new call set-up message, the node (now the source node) invokes a path selection mechanism at 120 to determine that the selected path to a destination includes a node, for which a SCCB is allocated at 122. If there is no allocated SCCB, no congestion exists and the call is accepted for the selected path at 124. At 126, the SCCB is queried if the call set-up message is acceptable by the node for which the SCCB is allocated. If the call set-up message is acceptable based on the maintained restriction level, the call is accepted for the selected path at 128. If unacceptable at 126, the call is refused by the source node. Optionally, the source node may have capability of suggesting an alternate path to the destination which avoids the congested node. In this case, at 130, an alternate path is determined and the process is repeated for the alternate path at 132, otherwise the call is refused by the source node at 134.

FIGS. 5 and 6 shows respectively a pseudo-code and a flowchart to adjust (or update) the restriction level (restriction_level) of a call admission rate. Some of the parameters used in the figures are listed and explained below:

TRR (Target Rejection Rate): The calls admitted towards a congestion point are restricted in such a way that the signaling congestion notifications received from a congestion point are within user specified Target Rejection Rate. In other words, ObservedRejectRate should not be larger than or equal to TRR.

MinRestriction: The calls admitted towards a congestion point will not be restricted below the MinRestriction threshold specified by user.

UpCount: A counter that keeps track of number of successive increase of the restriction level (loosening the restriction level). The counter resets to zero every time it is decided to decrease the restriction level (tightening the restriction level).

LinearUpCountInterval: The algorithm first increases the call admission rate in a linear fashion. If convergence is not achieved after a number of linear increases equal to LinearUpCountInterval, the call admission rate is then increased more aggressively until the capacity o the congestion point is reached.

ObservedRejectRate: Rate at which signaling congestion notifications are received from the associated congestion point.

AdmittedRate: Rate at which calls (set-up messages) are routed through the associated congestion point.

Referring to FIG. 6, updating the restriction level start at step 200 where state variable ObservedRejectRate and AdmittedRate are obtained respectively from SCFM and SCAC at every Tf timer tick. Note that Tf=n*Ta. At step 202, if ObservedRejectRate is greater than or equal to TRR, then restriction level is tightened to decrease the call admission rate, else the restriction level is loosened to increase the call admission rate. While tightening the restriction level, at step 204, it is determined if AdmittedRate+TRR−ObservedRejectRate is above MinRestricrion. If yes, the restriction level is set to AdmittedRate+TRR−ObservedRejectRate at step 206 and if no, it is set to MinRestriction at step 208. At step 210, a counter—UpCount—is reset to zero. While loosening the restriction level, at step 212, it is determined if UpCount is less than LinearUpCountInterval. If yes at step 212, it is decided that the restriction level is to be loosened by incrementing by one at step 214. If no at step 212, it is decided that the restriction level is to be loosened more aggressively by incrementing by $2^{UpCount\text{-}LinearUpCountInterval}$ at step 216. Therefore at step 218, the restriction level is set by incrementing by either value. This results in loosening the restriction level by different amounts. In the former case, just one additional call in the next Tf period will be allowed, while in the later case, $2^{UpCount\text{-}LinearUpCountInterval}$ more calls will be allowed in the same time period. UpCount is incremented by one at step 220. The updated restriction level is notified to SCAC at step 222. In order words, the tightening of the restriction levels is achieved by setting a new restriction level which is either a predetermined minimum threshold or an amount determined by the balance of the monitored rates.

A SCCB is retired if signaling congestion notifications are not received from the associated congestion point for sufficiently a long period of time.

As described thus far, the invention allows the network elements such as nodes to have knowledge of control plane congestion, thereby allowing them to make more intelligent routing decisions. This intelligence provides the following benefits:

Under congestion, the rate of successful call setup attempts along the optimal path is maximized.

The wasted signaling resources in nodes upstream of the congestion point are minimized. Thus, the efficiency of the signaling resources is increased.

Increases concurrency in call setup by routing around signaling congestion. This increases the probability of a successful call setup attempt and decreases the call latency.

The network is protected against signaling overload by regulating admission at the edge of the network.

What we claim as our invention is:

1. A method of improving performance of signaling resources in a telecommunications network, the method comprising:

receiving call set-up messages at a network element;

adjusting an admission rate at the network element for said call set-up messages based on a rate at which congestion notifications are received, wherein the admission rate is a number of the call set-up messages admitted per unit time;

invoking a path selection process on said call set-up messages to determine whether congestion exists at the network element;

when congestion does not exist at the network element, accepting said call set-up messages;

when congestion exists at the network element, obtaining a restriction level for the network element;

making a routing decision on said call set-up messages based on said restriction level;

executing the routing decision at the network element at which said call set-up messages are received; and periodically and dynamically adjusting the restriction level for said network element; and using the adjusted restriction level to adjust the admission rate to provide fast convergence of the admission rate to a capacity of the network element, wherein executing the routing decision involves either rejecting or accepting the call set-up messages;

monitoring a rate of accepted call set-up messages routed to the network element;

monitoring a congestion notification rate received from the network element; adjusting the restriction level dynamically, based on both the monitored rate of accepted call set-up messages and the monitored congestion notification rate;

tightening the restriction level when the congestion notification rate is larger than or equal to a preset congestion notification rate;

loosening the restriction level when the congestion notification rate is smaller than the preset congestion notification rate; and setting a new restriction level which is either a predetermined minimum threshold or a function of both the monitored rate of accepted call set-up messages and the monitored congestion notification rate.

2. The method according to claim 1, further comprising: setting a new restriction level which corresponds either to one additional acceptable call set-up message or to more than one additional acceptable call set-up message.

3. The method according to claim 1, further comprising: allocating a restriction level for said network element when a congestion notification is received from said network element and it is determined that no restriction level exists for said network element.

4. The method according to claim 3, further comprising: receiving the signaling congestion notification in response to the call set-up messages or by broadcasting.

5. The method according to claim 1, further comprising: performing a source routed path selection process on the call set-up messages.

6. The method according to claim 1, further comprising: performing a hop-by-hop path selection process on the call set-up messages.

7. The method according to claim 1, further comprising: selecting an alternative path for routing a particular call set-up message when the particular call set-up message is refused by the routing decision.

* * * * *